US009289960B2

(12) United States Patent
Robinson et al.

(10) Patent No.: US 9,289,960 B2
(45) Date of Patent: Mar. 22, 2016

(54) DUAL SHUTTLE PRESS

(71) Applicant: GroupeSTAHL, St. Clair Shores, MI (US)

(72) Inventors: Benjamin Robinson, Carmichaels, PA (US); Rich Antoszewski, Carmichaels, PA (US)

(73) Assignee: GroupeSTAHL, Sterling Heights, MI (US)

(*) Notice: Subject to any disclaimer, the term of this patent is extended or adjusted under 35 U.S.C. 154(b) by 0 days.

(21) Appl. No.: 14/677,005

(22) Filed: Apr. 2, 2015

(65) Prior Publication Data

US 2015/0283776 A1 Oct. 8, 2015

Related U.S. Application Data

(60) Provisional application No. 61/974,228, filed on Apr. 2, 2014.

(51) Int. Cl.

| | |
|---|---|
| ***B32B 37/00*** | (2006.01) |
| ***B30B 7/00*** | (2006.01) |
| ***D06Q 1/08*** | (2006.01) |
| ***D06Q 1/12*** | (2006.01) |
| ***B44C 1/17*** | (2006.01) |
| ***B30B 15/06*** | (2006.01) |

(52) U.S. Cl.

CPC ................. *B30B 7/00* (2013.01); *B30B 15/064* (2013.01); *B44C 1/1712* (2013.01); *D06Q 1/08* (2013.01); *D06Q 1/12* (2013.01)

(58) Field of Classification Search

CPC ...... B30B 7/00; B30B 15/064; B44C 1/1712; D06Q 1/08; D06Q 1/12

USPC ............................... 156/579, 580, 581, 583.1

See application file for complete search history.

(56) References Cited

U.S. PATENT DOCUMENTS 5,252,171 A * 10/1993 Anderson ............... B41F 16/02 100/50
5,474,633 A * 12/1995 Myers ..................... B41F 16/00 156/230
6,151,814 A * 11/2000 Raio ....................... D06F 71/08 38/30
7,185,584 B1 * 3/2007 Woods .................... B41F 16/02 100/224
8,042,588 B2 * 10/2011 Robinson .................. B30B 1/04 156/358
8,418,739 B2 * 4/2013 Robinson ............. B30B 15/028 156/358
9,038,690 B1 * 5/2015 Hsiao .................... B30B 15/028 156/583.1

* cited by examiner

*Primary Examiner* — James Sells
(74) *Attorney, Agent, or Firm* — Harness, Dickey & Pierce, PLC

(57) ABSTRACT

A heat press can include a frame, a first lower platen, a second lower platen, an upper platen, a press mechanism, a shuttle mechanism, and a heating element. The lower platens can be supported by the frame. The press mechanism can be coupled to the upper platen and operable to move the upper platen between open and closed positions. In the open position, the upper platen can be spaced apart from the lower platens by a greater distance than when in the closed position. The shuttle mechanism can be supported by the frame and can move the press mechanism linearly between a first position and a second position. In the first position, the upper platen can be located above the first lower platen. In the second position, the upper platen can be located above the second lower platen. The heating element can be configured to heat the upper platen.

20 Claims, 5 Drawing Sheets

DUAL SHUTTLE PRESS

CROSS-REFERENCE TO RELATED APPLICATIONS

This application claims the benefit of U.S. Provisional Application No. 61/974,228, filed on Apr. 2, 2014. The entire disclosure of the above application is incorporated herein by reference.

FIELD

The present disclosure relates to dual shuttle press for applying heat-activated articles to a workpiece.

BACKGROUND

This section provides background information related to the present disclosure which is not necessarily prior art.

Heat presses for heat and pressure printing and transfer applications typically include a lower platen and an upper platen that is generally above the lower platen and configured to press down on the lower platen. Typically, a work piece (e.g. fabric or garment) and a heat-activated article (e.g. letters, logos, images, graphics) are positioned on the lower platen while the upper platen is separated from the lower platen. Once the work piece and article are properly positioned, the upper platen is moved vertically down over the lower platen to sandwich the work piece and article between the upper and lower platens. One or both of the platens typically contains a heating element and the platens are configured to apply a preset amount of heat and pressure to the work piece and article for a predetermined amount of time (i.e. cure time). After the cure time is completed, the upper platen is lifted up so that the operator can remove the finished product. When multiple products are to be produced, or when larger work pieces have more than one heat-activated article located in different locations of the work piece, the operator must remove the product of the first application and then position the next work piece (or re-position the original work piece) and the next heat-activated article on the lower platen.

Positioning the work piece and the article requires time and care to ensure accurate positioning. For example, the operator may need to measure distances on each individual work piece in order to position the articles, or may need to change out the lower platen for a different lower platen having a different shape or orientation. During the time that an operator is positioning the work piece and article, the heat press is otherwise inactive and during the cure time, the operator is unable to otherwise prepare the heat press for the next product. These down-times for the heat press and the operator can increase the overall production times and costs. In order to reduce overall production time, operators typically must use a second heat press, which can be costly and take up additional shop space. Furthermore, such heat presses can be large and heavy. Thus they are typically limited to a single, stationary location within a shop due to the difficulty in moving the heat press.

SUMMARY

This section provides a general summary of the disclosure, and is not a comprehensive disclosure of its full scope or all of its features.

The present teachings provide for a heat press including a frame, a first lower platen, a second lower platen, an upper platen, a press mechanism, a shuttle mechanism, and a heating element. The first and second lower platens can be supported by the frame. The press mechanism can be coupled to the upper platen and can be operable to move the upper platen between a closed position and an open position. In the open position, the upper platen can be spaced apart from the first and second lower platens by a greater distance than when in the closed position. The shuttle mechanism can be supported by the frame and can be configured to move the press mechanism linearly between a first position and a second position. In the first position, the upper platen can be located above the first lower platen. In the second position, the upper platen can be located above the second lower platen. The heating element can be configured to heat the upper platen.

The present teachings provide for a heat press including a frame, a first lower platen, a second lower platen, an upper platen, a press mechanism, a shuttle mechanism, a heating element, a set of first lasers, and a set of second lasers. The first and second lower platens can be supported by the frame. The press mechanism can be coupled to the upper platen and can be operable to move the upper platen between a closed position and an open position. In the open position, the upper platen can be spaced apart from the first and second lower platens by a greater distance than when in the closed position. The shuttle mechanism can be supported by the frame and can be configured to move the press mechanism between a first position and a second position. In the first position, the upper platen can be located above the first lower platen. In the second position, the upper platen can be located above the second lower platen. The heating element can be configured to heat the upper platen. Each of the first lasers can be coupled to the frame and can be configured to project laser light onto the first lower platen. Each of the second lasers can be coupled to the frame and can be configured to project laser light onto the second lower platen.

The present teachings provide for a heat press including a frame, a first lower platen, a second lower platen, an upper platen, a press mechanism, a shuttle mechanism, a heating element, and a toggle linkage. The first and second lower platens can be supported by the frame. The press mechanism can be coupled to the upper platen and can be operable to move the upper platen between a closed position and an open position. In the open position, the upper platen can be spaced apart from the first and second lower platens by a greater distance than when in the closed position. The shuttle mechanism can be supported by the frame and can be configured to move the press mechanism between a first position and a second position. In the first position, the upper platen can be located above the first lower platen. In the second position, the upper platen can be located above the second lower platen. The heating element can be configured to heat the upper platen. The toggle linkage can be coupled to the frame. The toggle linkage can include a lever and a clamp. The lever can be coupled to the clamp to move the clamp between a locked position and an unlocked position. At least one of the lower platens can include an alignment member that can be received in the frame. When the clamp is in the locked position the clamp can engage the alignment member to prevent removal of the one of the lower platens from the frame. When the clamp is in the unlocked position the clamp can disengage the alignment member to permit the one of the lower platens to be disengaged from the frame.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
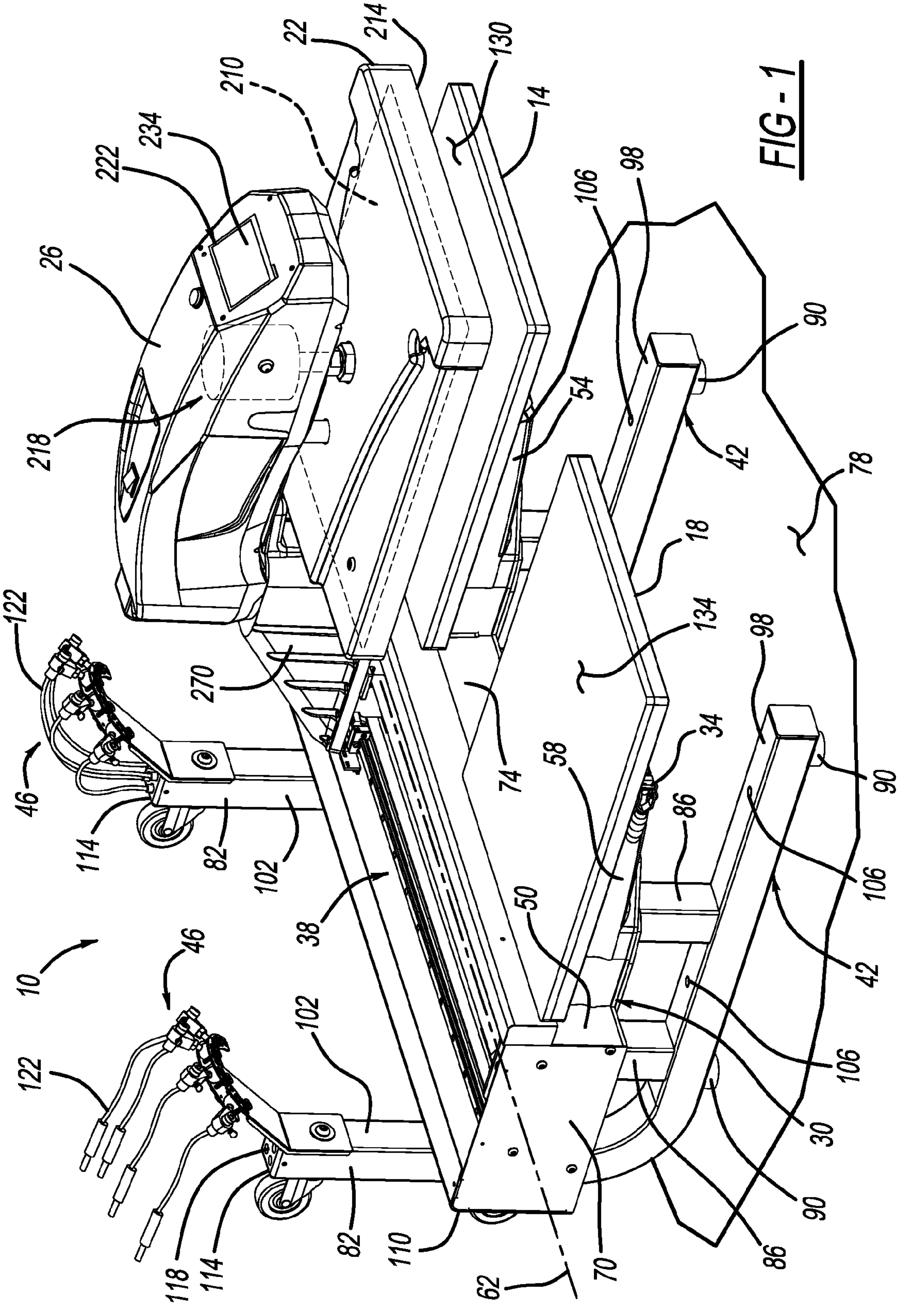
FIG. 1 is a perspective view of a heat press constructed in accordance with the present teachings.
Figure 2:
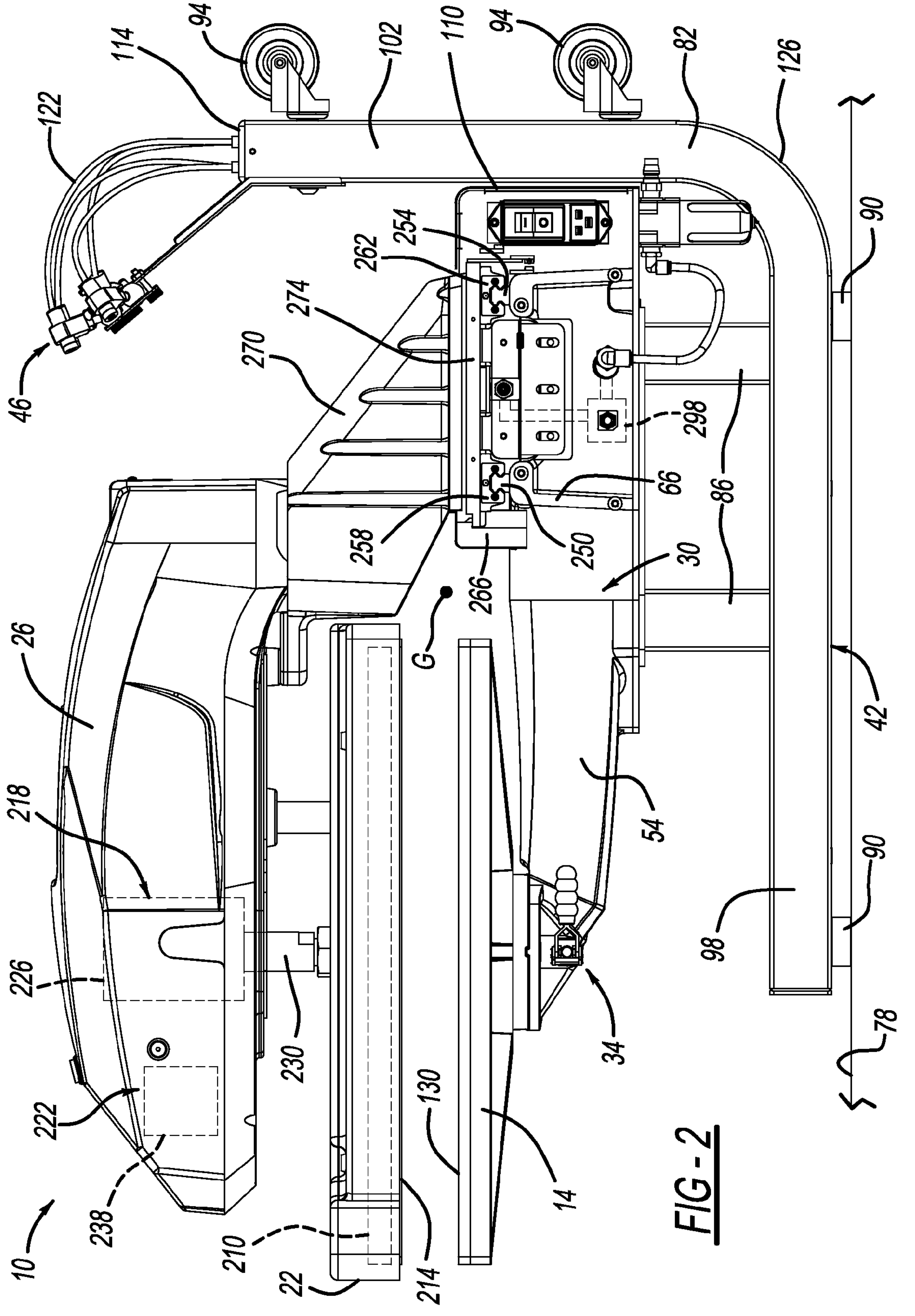
FIG. 2 is a side view of the heat press of FIG. 1.

With reference to FIGS. 1 and 2, a heat press 10 is illustrated. The heat press 10 can include a first lower platen 14, a second lower platen 18, an upper platen 22, an upper arm 26, a frame 30, a pair of quick release mechanisms 34, a shuttle mechanism 38, a pair of leg assemblies 42, and a pair of laser assemblies 46.

The frame 30 can be a generally rigid structure having a main body 50, a first lower arm 54, and a second lower arm 58. In the example provided, the frame 30 is a cast metal structure, though other configurations can be used. The main body 50 can extend longitudinally along a main axis 62. The first lower arm 54 can be fixedly coupled to the main body 50 and can extend outward therefrom, proximate to a first end 66 of the main body 50. The second lower arm 58 can be fixedly coupled to the main body 50 and can extend outward therefrom, proximate to a second end 70 of the main body 50 that is axially opposite the first end 66. The lower arms 54, 58 can extend outward from a front side 74 of the main body 50 such that the lower arms 54, 58 can be generally parallel to each other and transverse to the main axis 62.

The leg assemblies 42, known as "flip-it, ship-it legs", can be fixedly coupled to the frame 30 and configured to support the frame 30 above and spaced apart from a support surface 78 such as a floor, table, or workbench for example. A first one of the leg assemblies 42 can be located proximate to the first end 66 of the main body 50 and a second one of the leg assemblies 42 can be located proximate to the second end 70 of the main body 50. Each of the leg assemblies 42 can include a leg 82, a set of risers 86, a pair of pads 90, and a pair of wheels 94. The legs 82 and risers 86 can be fabricated from tubular steel to provide a rigid support. The tubular construction also permits wires (not shown) to be routed through the interior of the legs 82 to protect the wires (not shown). Each leg 82 can form a generally "L" shape having a bottom portion 98 and a side portion 102. The risers 86 can extend between the bottom portions 98 and the frame 30 to support the frame 30 spaced above the bottom portions 98 and the support surface 78. The frame 30 can be fixedly coupled to the risers 86. The risers 86 can support the frame 30 and lower arms 54, 58 above the support surface 78 such that there is ample space below the lower arms 54, 58 and frame 30 to allow for excess material of a work piece (not shown) or a heat-sensitive article (not shown) to be located below the lower platens 14, 18 and frame 30 during transfer operations.

Each of the bottom portions 98 of the legs 82 can extend below one of the first or second lower arms 54, 58 and in the example provided, can generally align longitudinally with one of the first or second lower arms 54, 58. The bottom portions 98 can define a plurality of mounting holes 106 configured to receive a plurality of fasteners (not shown; e.g. screws or bolts) to optionally secure the legs 82 to the support surface 78. The pads 90 can be mounted to the bottom side of the bottom portions 98 and can be formed of an anti-vibration, anti-slip material to stabilize the heat press 10 on the support surface 78. The center of gravity of the heat press 10, denoted by point G in FIG. 2, can be located between the pads 90. Since the frame 30, risers 86 and legs 82 form a self-contained C-frame, the legs 82 support only the weight of the heat press 10, and the pressing forces, which are described below, are not transmitted through the leg assemblies 42 to the support surface 78.

Each of the side portions 102 can extend upward from the bottom portions 98 proximate to a rear side 110 of the main body 50. The top end of each side portion 102 can include a tube cap 114. The tube cap 114 can include one or more programmable power outlets 118 that can permit wires 122 that run from the laser assemblies 46 to be removably plugged into the power outlets 118 and electrically connected to wires (not shown) that can run through the tubular interior of the legs 82. In this way, the wires 122 of the laser assemblies 46 can be disconnected without re-routing the wires (not shown) through the legs 82.

Each of the side portions 102 can blend into one of the bottom portions 98 via a radius 126 located at the joint of the "L" shape of each leg 82. The radius 126 can be configured to permit a single operator to rock the heat press 10 backwards off the pads 90 and onto the radius, and then onto the wheels 94 which are mounted to the side portions 102 of the legs 82. Thus, the heat press 10 can be rotated 90° until the rear side 110 of the main body 50 opposes and is supported above the support surface 78 by the side portions 102 and the wheels 94. The pair of wheels 94 can be mounted to the side portions 102 such that the wheels 94 can support the heat press 10 and permit it to be rolled about the support surface 78 when in this flipped orientation. The wheels 94 can be positioned such that the center of gravity G of the heat press 10 can be located between each wheel 94 when the heat press 10 is supported by the wheels 94. The wheels 94 can be large diameter casters capable of rolling in any direction.

The first lower platen 14 can be mounted to the first lower arm 54. The first lower platen 14 can have a first work surface 130 that generally faces upward toward the upper platen 22 when the upper platen 22 is disposed above the first lower platen 14. In the example provided, the first work surface 130 is a square shape and is a flat surface that is parallel to the support surface 78, though other configurations can be used. For example, the first work surface 130 can be any shape having any number of sides depending on the application. The first lower platen 14 can be removably mounted to the first lower arm 54 by one of the quick release mechanisms 34 as described in greater detail below.

The second lower platen 18 can be similar to the first lower platen 14 described above, except the second lower platen 18 can be removably mounted to the second lower arm 58 by one of the quick release mechanisms 34. Thus, the second lower platen 18 can be generally next to the first lower platen 14. The second lower platen 18 can have a second work surface 134 that can be similar to the first work surface 130, or the first and second work surfaces 130, 134 can have different configurations.

Figure 4:
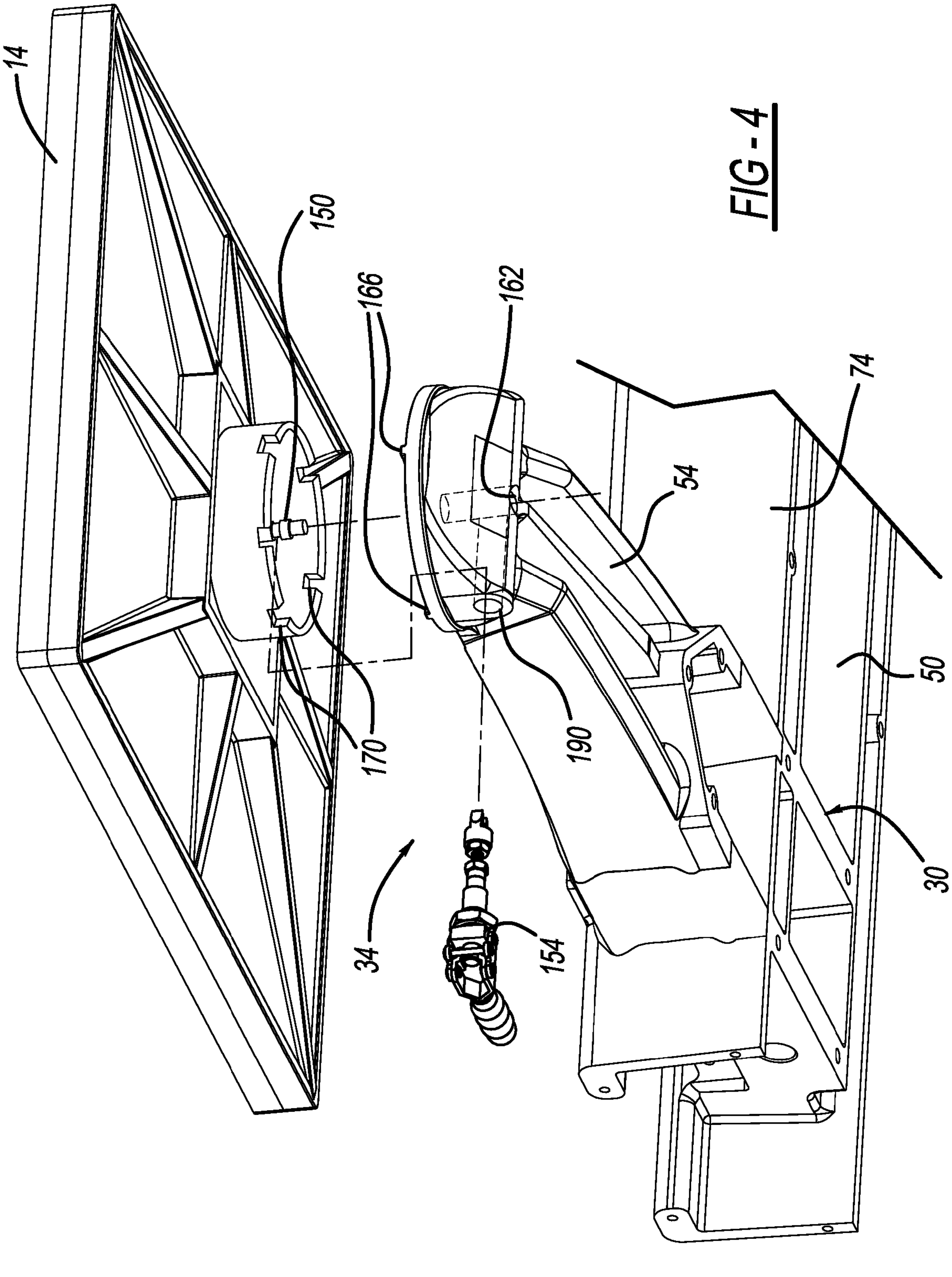
FIG. 4 is a perspective view of a portion of the heat press of FIG. 1, illustrating a lower platen and a support arm in a disconnected condition.
Figure 5:
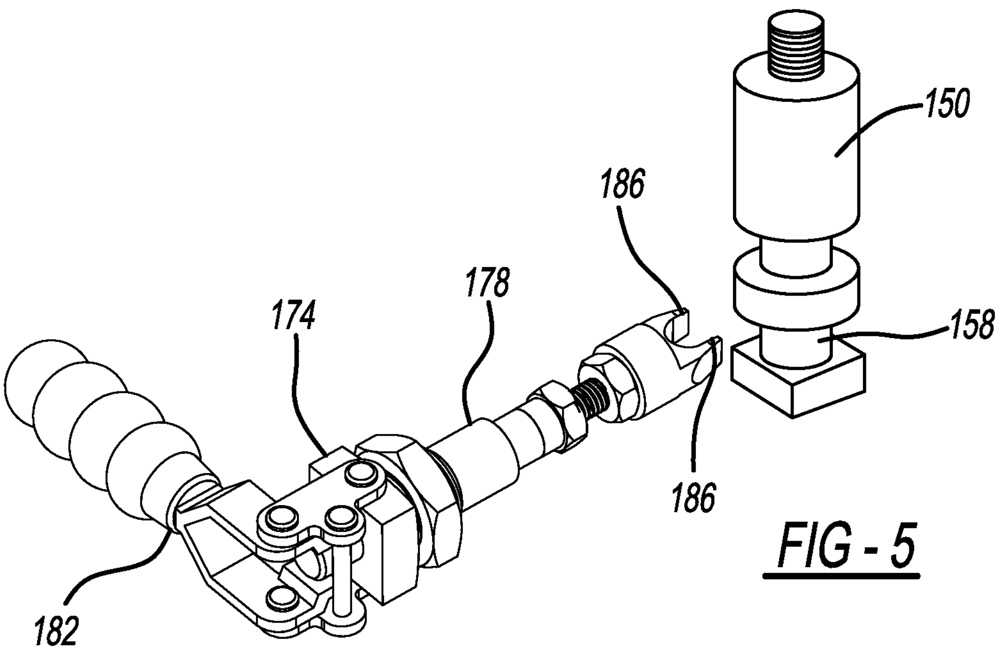
FIG. 5 is a perspective view of a portion of the heat press of FIG. 1, illustrating a locking mechanism of the lower platen and support arm of FIG. 4.

With additional reference to FIGS. 4 and 5, the quick release mechanism 34 can include an alignment pin 150 and a toggle linkage 154. The alignment pin 150 can be fixedly coupled to the bottom of one of the lower platens 14, 18 by any suitable means. The alignment pin 150 can be a generally cylindrical body that can have one end threadably coupled to the lower platen 14, 18 and the opposite end can define a groove 158. The groove 158 can extend about the circumference of the alignment pin 150. The alignment pin 150 can extend vertically downward from the lower platen 14, 18 and can be received through an alignment aperture 162 that is defined by a corresponding one of the lower arms 54, 58. When received through the alignment aperture 162, the lower platen 14, 18 can be vertically supported by the lower arm 54, 58 and the alignment pin 150 can prevent horizontal movement of the lower platen 14, 18. The lower platen 14, 18 can be configured to engage the lower arm 54, 58 such that the lower platen 14, 18 cannot be rotated about the alignment pin 150 when the alignment pin 150 is fully inserted into the alignment aperture 162. In the example provided, the lower arm 54, 58 defines a plurality of alignment ridges 166 and the lower platen 14, 18 defines a plurality of mating alignment notches 170 configured to receive the alignment ridges 166 and rotationally fix the lower platen 14, 18 relative to the lower arm 54, 58. In the example provided, the alignment notches 170 are positioned at 90° intervals about the alignment pin 150 such that the lower platen 14, 18 can be supported by the lower arm 54, 58 in a plurality of rotational positions (e.g. portrait, landscape), though additional notches can be included to allow for intermediate positions.

The toggle linkage 154 can include a base 174, a clamp 178, and a lever 182. The base 174 can be fixedly coupled to the lower arm 54, 58 and can have a generally tubular shape. The lever 182 can be pivotably coupled to the base 174 and separately pivotably coupled to the clamp 178. One end of the clamp 178 can be slidably received through the base 174. The other end of the clamp 178 can be a claw like structure that defines a pair of spaced apart prongs 186 and is received in a clamp aperture 190 defined by the lower arm 54, 58. The clamp aperture 190 can intersect with the alignment aperture 162 within the lower arm 54, 58. The toggle linkage 154 can be configured such that pivoting the lever 182 from an unlocked position (shown) to a locked position (not specifically shown) can slide the clamp 178 axially within the base 174 and the clamp aperture 190. In the locked position, the prongs 186 can be received in the groove 158 of the alignment pin 150 to prevent the alignment pin 150 from being removed from the alignment aperture 162. In of the unlocked position, the prongs 186 are retracted from the groove 158 and the lower platen 14, 18 can be lifted upwards until the alignment ridges 166 and mating alignment notches 170 are disengaged to permit the lower platen 14, 18 to be rotated about the alignment pin 150. In the unlocked position, the lower platen 14, 18 can also be lifted upwards until the alignment pin 150 is removed from the alignment aperture 162 to swap out the lower platen 14, 18 with a different lower platen (not specifically shown).

Returning to FIGS. 1 and 2, the upper platen 22 can include a heating element 210 and an upper work surface 214. The heating element 210 can be any suitable device configured to heat the upper work surface 214, such as an electrical resistance element disposed within the upper platen 22 for example. The upper work surface 214 can be configured to oppose and generally mate with the first and second work surfaces 130, 134 of the lower platens 14, 18. In the example provided, the upper work surface 214 is a flat, square surface that is parallel to the first and second work surfaces 130, 134, though other configurations can be used.

The upper arm 26 can support the upper platen 22 above the lower platens 14, 18 and can include a press mechanism 218 and a control device 222. The upper arm 26 can be coupled to the shuttle mechanism 38 to be moved axially along the axis 62 between a first position (shown) wherein the upper platen 22 is located above the first lower platen 14, and a second position (not specifically shown) wherein the upper platen 22 is located above the second lower platen 18. The upper arm 26 can also be positioned in intermediate positions (not shown) wherein the upper platen is disposed between the first and second positions.

The press mechanism 218 can be configured to move the upper platen 22 vertically relative to the lower platens 14, 18. In the example provided, the press mechanism 218 includes a pneumatic cylinder 226 and a piston 230. The cylinder 226 can be configured to move the piston 230 vertically. The piston 230 can be fixedly coupled to the upper platen 22 to move the upper platen 22 between an open position (shown) and a closed position (not specifically shown) in which the upper work surface 214 is positioned closer to the first or second work surface 130, 134 to sandwich the work piece and article between the upper platen 22 and the respective lower platen 14, 18.

The control device 222 can include a touch-screen display 234 and a control circuit or module 238 that can be configured to control the operation of the heating element 210, the press mechanism 218, and the shuttle mechanism 38. The control module 238 can include or can be in communication with a computer-readable medium or memory circuit (not specifically shown) for storing programs and/or information for use by the control module 238. The touch-screen display 234 can display settings of the heat press 10 and permit an operator to manually control the heat press 10, or to program the control module 238 for automatic operation. For example, the control device 222 can control the vertical position of the upper platen 22 relative to the lower platens 14, 18, the temperature output of the heating element 210, the pressure of the press mechanism 218, and the amount of time that heat and pressure are applied. The control module 238 can also control the axial position of the upper arm 26 along the axis 62 by controlling the shuttle mechanism 38, as described below.

Figure 3:
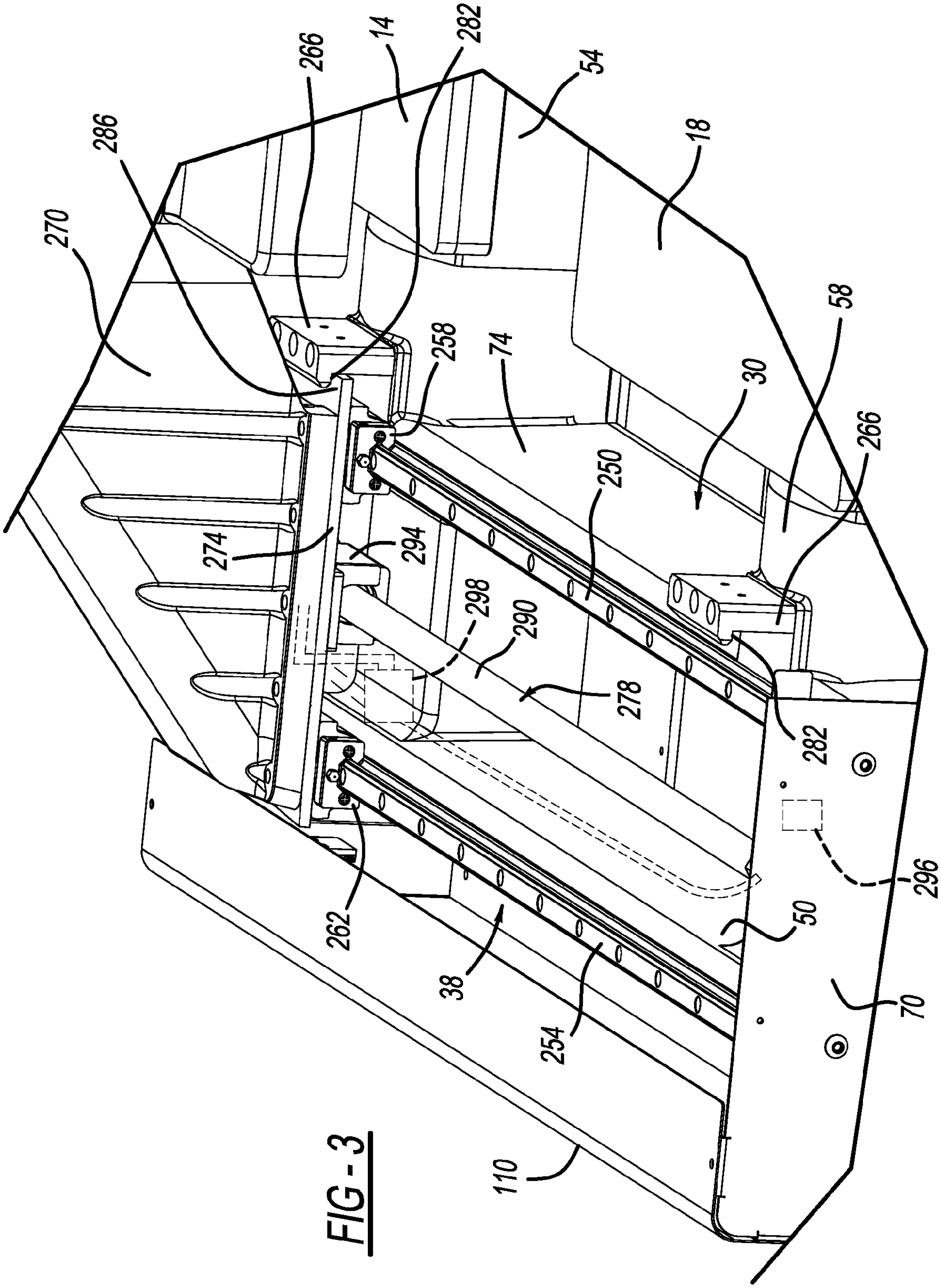
FIG. 3 is a perspective view of a portion of the heat press of FIG. 1, illustrating a portion of a shuttle mechanism of the heat press.

With additional reference to FIG. 3, the shuttle mechanism 38 can be configured to move the upper arm 26 between the first position (shown) wherein the upper platen 22 is located above the first lower platen 14, and the second position (not specifically shown) wherein the upper platen 22 is located above the second lower platen 18. The shuttle mechanism 38 can include a front rail 250, a rear rail 254, a set of front sliders or blocks 258, a set of rear sliders or blocks 262, a plurality of keeper members 266, a carriage 270, a carriage plate 274, and a linear actuator 278. The front and rear rails 250, 254 can be fixedly mounted to the main body 50 of the frame 30 and can extend longitudinally parallel to the axis 62 between opposite ends 66, 70 of the main body 50. The front rail 250 can be proximate to the front side 74 of the main body 50 and the rear rail 254 can be proximate to the rear side 110 of the main body 50. The rails 250, 254 can be located generally below the upper arm 26, and in the example provided, the rails 250, 254 can be located below the first and second work surfaces 130, 134 of the lower platens 14, 18. The front and rear blocks 258, 262 can be slidably mounted to the front and rear rails 250, 254, respectively. The blocks 258, 262 can be low friction, precision steel linear bearings configured to reduce friction between the blocks 258, 262 and the rails 250, 254, though other types of bearings can be used. The carriage plate 274 can span between the front and rear blocks 258, 262, and be fixedly coupled to the blocks 258, 262 for common translation along the axis 62. The carriage plate 274 can be supported by the upper surfaces of the blocks 258, 262 such that the carriage plate 274 sits atop the blocks 258, 262.

The carriage 270 can be fixedly coupled to the upper arm 26 and the carriage plate 274 to support the upper arm 26 generally above the carriage plate 274 and the lower platens 14, 18. One of the keeper members 266 can be located proximate to the first end 66 of the main body 50. The keeper member 266 can be fixedly coupled to the main body 50. The keeper member 266 can generally extend upward from the main body 50 and can define a retaining lip 282. The retaining lip 282 can extend generally inward toward the axis 62. When the upper arm 26 is in the first position, the retaining lip 282 can overlap with an edge 286 of the carriage plate 274, which in the example provided overhangs from the front blocks 258. The keeper member 266 can be configured such that when the press mechanism 218 is activated to provide pressure to the first lower platen 14, the reaction forces at the carriage plate 274 can be transferred through the keeper member 266 to the main body 50, which minimizes pressure forces received by the blocks 258, 262 and rails 250, 254.

Another one of the keeper members (not specifically shown) can be located proximate to the second end 70 of the main body 50, similar to the keeper member 266 shown in FIG. 3, to similarly transfer pressure forces when the upper arm 26 is in the second position over the second lower platen 18. Thus, when the upper arm 26 is in either position, a load path exists for thousands of pounds of pressing force to pass through the rigid frame instead of the bearing supports (i.e. the blocks 258, 262). The effect is to reduce the moment load seen by the precision linear bearings of the blocks 258, 262 and rails 250, 254, and to minimize deflections of the upper arm 26 and upper platen 22. The reduced deflections provide a higher level of parallelism and accuracy when the upper platen 22 and the lower platen 14, 18 converge during pressing operations. Superior product transfer is then achievable by reducing scuffing and lateral motion between the work piece and the article.

The linear actuator 278 can be supported by the main body 50 between the front and rear rails 250, 254. In the example provided, the linear actuator 278 is a pneumatic rodless cylinder that includes a guide 290 and a slider 294, though any suitable type of linear actuator 278 can be used. The guide 290 can be a cylindrical body extending along the axis 62 between opposite ends 66, 70 of the main body 50 and can house a piston (not shown) that can be moved axially within the guide 290 by pneumatic pressure within the guide 290. The slider 294 can be disposed about the guide 290 and the piston (not shown) can be coupled to the slider 294 to move the slider 294 axially along the guide 290. In the example provided, the piston (not shown) and slider 294 are magnetically coupled, though other configurations can be used. The slider 294 can be fixedly coupled to the carriage plate 274 to move the carriage plate 274 along the axis 62. Since the carriage plate 274 is supported by the blocks 258, 262, the linear actuator 278 can operate at low pressures, and can stall without damage when an immovable object or the operator obstructs the path of the slider 294 or elements moving with the slider 294.

Figure 6:
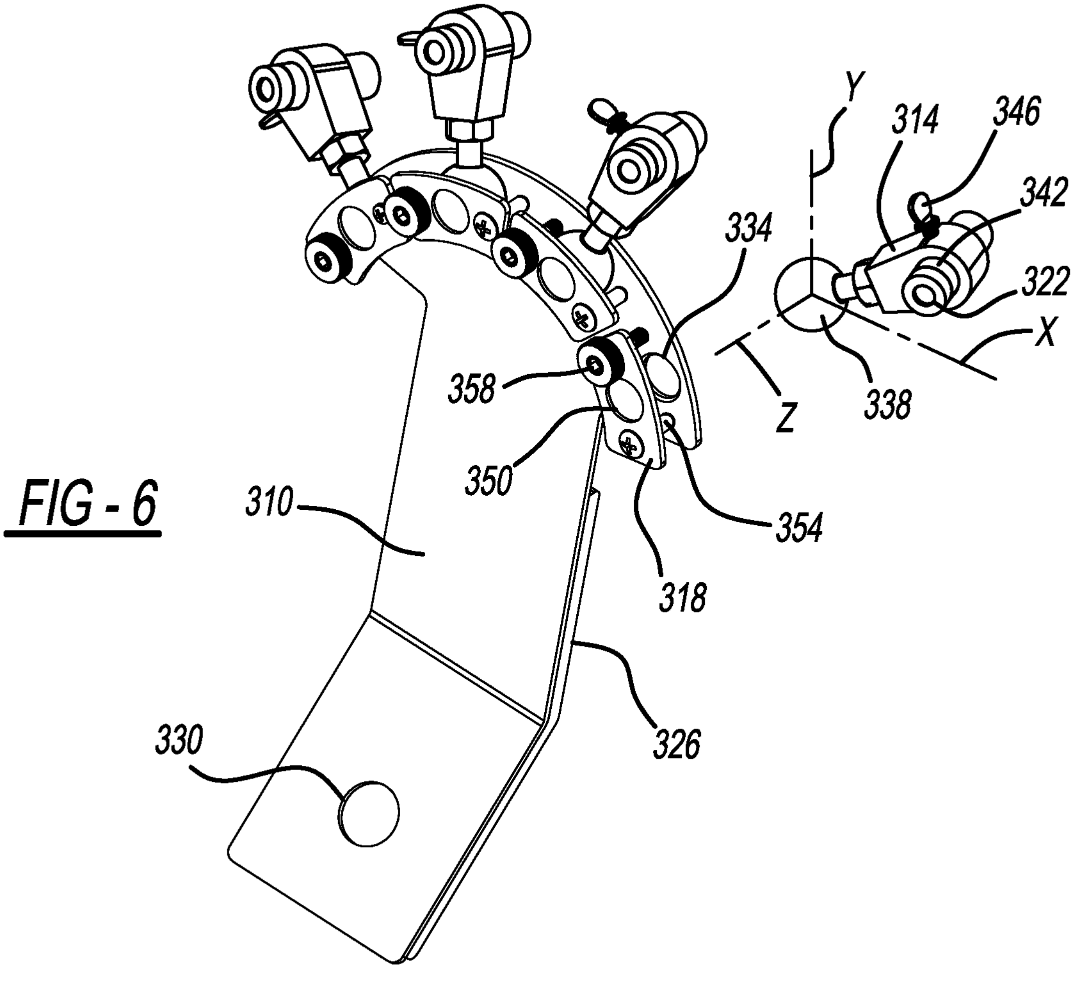
FIG. 6 is a perspective view of a portion of the heat press of FIG. 1, illustrating a laser mount of the heat press.

With additional reference to FIG. 6, the laser assembly 46 can be an optional bolt on accessory. Each laser assembly 46 can include a bracket 310, a mount 314, a mount plate 318, and a laser 322. The bracket 310 can be a generally flat, plate-like structure that can define a pair of alignment tabs 326 that extend from the back of the bracket 310. The bracket 310 can be fixedly mounted to the top end of one of the side portions 102 of the legs 82. The side portion 102 can be received between the alignment tabs 326 to align the bracket with the side portion 102. In the example provided, the bracket 310 is coupled to the side portion 102 by a bolt (not shown) aperture 330 in one end of the bracket 310, though other configurations can be used. An opposite end of the bracket 310 can be bent or angled forward and can define a first ball aperture 334.

One end of the mount 314 can define a ball 338, while the other end can define an aperture 342 through which the laser 322 can be received. A set screw 346 can be received through the mount to fix the position of the laser 322 within the aperture 342. The set screw 346 can be a “thumb” screw configured to be tightened and loosened by hand. The mount plate 318 can define a second ball aperture 350. The ball 338 can be disposed between the bracket 310 and the mount plate 318 such that the ball 338 is partially received in each of the ball apertures 334, 350. The mount plate 318 can be coupled to the bracket 310 by an alignment bolt 354 and a thumb screw 358 that can be disposed on opposite sides of the ball 338. The thumb screw 358 can be configured to be tightened and loosened by hand to tighten or loosen the pressure exerted on the ball 338 by the bracket 310 and the mount plate 318. Thus, when the thumb screw 358 is loosened, the ball 338 can be pivoted within the ball apertures 334, 350 to point the laser 322 in a desired direction. For example, the mount 314 can be pivoted about the center of the ball 338 about three axes X, Y, Z. Thus the mount 314 can have three degrees of rotational freedom and can tilt (i.e. pitch), swivel (i.e. yaw), and pivot (i.e. roll) about the center of the ball 338. Tightening the thumb screw 358 can hold the ball 338, and thus the laser 322, in a desired position.

In the example provided, the laser assembly 46 includes a plurality of the mounts 314, mount plates 318, and lasers 322, and the bracket defines a plurality of the first ball apertures 334. The first ball apertures 334 can be located in an arcuate pattern about the bracket 310. The mount plates 318 can be separately coupled to the bracket 310 by corresponding alignment bolts 354 and thumb screws 358 such that each of the lasers 322 can be individually positioned. In the example provided, the lasers 322 are low watt, class 2 lasers, though any suitable type of laser can be used. The lasers 322 can be configured to emit any suitable color, shape or pattern (e.g. light stripes, cross hairs, dots). The body of the laser 322 can be generally cylindrical such that rotation of the laser 322 within the mount 314 can allow the shape or pattern to be rotated. The wires 122 (shown in FIGS. 1 and 2) can electrically couple the lasers 322 to the control device 222 to permit the lasers 322 to be controlled and powered by the control device 222. The wires can be quick connect plugs to plug into the tube cap 114 (shown in FIGS. 1 and 2) as described above.

Returning to FIG. 1, when the upper arm 26 is in the first position, the control device 222 can be configured to turn on the lasers 322 that are mounted proximate to the second end 70 and turn off the lasers 322 that are mounted proximate to the first end 66. Thus, the lasers 322 can illuminate the second lower platen 18 to assist an operator in positioning the work piece and article on the second lower platen 18 while the upper platen 22 is positioned above the first lower platen 14. The control device 222 can be configured to automatically apply a predetermined amount and time of heat and pressure to the first lower platen 14. When the heat and pressure application in the first position is complete, the control device 222 can be configured to automatically control the press mechanism 218 to lift the upper platen 22 and then control the shuttle mechanism 38 to move the upper arm 26 along the axis 62 until the upper arm 26 is in the second position. The control device 222 can be configured to automatically apply a predetermined amount and time of heat and pressure to the second lower platen 18 when the upper arm 26 reaches the second position. The amount of time and/or pressure and/or temperature can be the same or different between the first and second lower platens 14, 18. Additionally, the control device 222 can be configured to provide multiple pressing sequences while still at the first or second lower platen 14, 18. The pressing sequences can be programmed for different pressures, temperatures, and/or times. For example, the upper platen 22 can apply a high amount of pressure for a first predetermined time to the first lower platen 14, followed by an application of a lower amount of pressure for a second predetermined time to the first lower platen 14, before moving to the second lower platen 18. When the upper arm 26 is moved to the second position, the control device 222 can also be configured to automatically turn off the lasers 322 that are proximate to the second end 70 and turn on the lasers 322 that are proximate to the first end 66 to illuminate the first lower platen 14. Thus, the operator can position a work piece and article on the first platen while the upper platen 22 is above the second lower platen 18. Similarly, when the heat and pressure application in the second position is complete, the press mechanism 218 can lift the upper platen 22, the shuttle mechanism 38 can move the upper arm 26 along the axis 62 back to the first position, and the lasers 322 can again illuminate the second lower platen 18. The control device 222 can be configured to repeat these operations for a predetermined amount of cycles or until stopped by the operator. The shuttle mechanism 38 can move the upper arm 26 between the first and second positions at a relatively quick velocity and must decelerate the upper arm 26 in a smooth, controlled manner as it approaches the final position. This deceleration can be partially aided by a mechanical shock absorber, cushion, or other energy absorbing material (not specifically shown) located proximate to each end 66, 70. For example, when the upper arm 26 approaches the second position, a portion of the shuttle mechanism 38 (e.g. the carriage 270, carriage plate 274, blocks 258, 262, or the slider 294) can impact the energy absorbing material (not shown) to decelerate the upper arm 26.

Additionally or alternatively, the control device 222 can be configured to control the air pressure to the linear actuator 278 to decelerate the slider 294 as it approaches the final position. For example, as the upper arm 26 approaches the second position, a sensor 296 (shown in FIG. 3) can detect the position of the upper arm 26 (e.g. by detecting the position of the slider 294, carriage 270, carriage plate 274, or blocks 258, 262) and send a signal to the control device 222. The control device 222 can then control an air control valve 298 (shown in FIGS. 2 and 3) to perform an air brake sequence. The control device 222 can control the valve 298 to vent air from the side of the guide 290 that is proximate to end 66 while applying a sequence of alternating air impulses and venting to the opposite side of the guide 290 (i.e. proximate to end 70). In other words, immediately after applying the impulse of air to the second side of guide 290 (i.e. proximate to end 70), the valve 298 can vent the second side of the guide 290, then apply another impulse of air to the second side followed again by venting the second side. This sequence of alternating impulses and venting can be done several times until the sensor 296 (or an additional sensor not shown) indicates that the upper arm 26 has reached its final position (e.g. the second position). Once the upper arm 26 has reached its final position (e.g. the second position), the valve 298 can exhaust the air from the second side of the guide 290 (e.g. proximate to end 70) and apply pressure to the first side (e.g. proximate to end 66) to hold the upper arm 26 in second position. A similar sensor (not specifically shown) can be used at the other end 66 to similarly control deceleration of the upper arm 26 as it approaches the first position.

The control device 22 can be configured to adapt the amount of time and pressure of the air impulses during the air breaking sequence based on the tilt of the heat press 10, and wear or friction changes over time of the various components (e.g. friction of blocks 258, 262 on rails 250, 254). For example, the time duration of the air impulse application can be calculated for each cycle based on the blended speed of the last cycle.

Thus, the dual shuttle heat press 10 of the present disclosure reduces the downtime between pressing operations, eases positioning of heat-activated articles on a work piece, and allows for easy moving of the entire heat press 10.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as “inner,” “outer,” “beneath,” “below,” “lower,” “above,” “upper,” and the like, may be used herein for ease of description to describe one element or feature’s relationship to another element(s) or feature(s) as illustrated in the figures. Spatially relative terms may be intended to encompass different orientations of the device in use or operation in addition to the orientation depicted in the figures. For example, if the device in the figures is turned over, elements described as “below” or “beneath” other elements or features would then be oriented “above” the other elements or features. Thus, the example term “below” can encompass both an orientation of above and below. The device may be otherwise oriented (rotated 90 degrees or at other orientations) and the spatially relative descriptors used herein interpreted accordingly.

What is claimed is:

1. A heat press comprising:

a frame;

first and second lower platens supported by the frame;

an upper platen;

a press mechanism coupled to the upper platen and operable to move the upper platen between a closed position and an open position, wherein in the open position the upper platen is spaced apart from the first and second lower platens a greater distance than when in the closed position;

a shuttle mechanism supported by the frame and configured to move the press mechanism linearly between a first position wherein the upper platen is located above the first lower platen, and a second position wherein the upper platen is located above the second lower platen;

a heating element configured to heat the upper platen.

2. The heat press of claim 1, wherein the shuttle mechanism includes a pair of rails, a carriage plate, and a keeper member, the carriage plate being slidably coupled to the rails and fixedly coupled to the press mechanism, the keeper member being fixedly coupled to the frame and configured engage a portion of the carriage plate when the press mechanism is operated, the keeper member preventing substantial pressing loads from transferring though the rails.

3. The heat press of claim 2, wherein the carriage plate is slidably coupled to the rails by a set of linear bearings, the carriage plate # being fixedly coupled to the linear bearings.

4. The heat press of claim 1, wherein the shuttle mechanism includes a rodless cylinder, the rodless cylinder being configured to move the press mechanism between the first and second positions.

5. The heat press of claim 1, further comprising:

a control module configured to control the press mechanism and the shuttle mechanism to automatically move the press mechanism from one of the first and second positions to the other of the first and second positions after moving the upper platen from the closed position to the open position.

6. The heat press of claim 1, further comprising:

a toggle linkage coupled to the frame, the toggle linkage including a lever and a clamp, the lever being coupled to the clamp to move the clamp between a locked position and an unlocked position;

wherein at least one of the first and second lower platens includes an alignment pin received in the frame;

wherein when the clamp is in the locked position the clamp engages the alignment pin to prevent removal of the one of the lower platens from the frame, and when the clamp is in the unlocked position the clamp disengages the alignment pin to permit the one of the lower platens to be disengaged from the frame.

7. The heat press of claim 1, further comprising a set of first lasers and a set of second lasers, each of the first lasers being coupled to the frame and configured to project laser light onto the first lower platen, each of the second lasers being coupled to the frame and configured to project laser light onto the second lower platen.

8. The heat press of claim 7, further comprising a set of first mounts and a set of second mounts, each of the first mounts supporting one of the first lasers for tilting, swiveling, and pivoting about a central point of the first mount, each of the second mounts supporting one of the second lasers for tilting, swiveling, and pivoting about a central point of the second mount.

9. The heat press of claim 7, further comprising a controller configured to activate the first lasers and deactivate the second lasers when the press mechanism is in the second position, and to activate the second lasers and deactivate the first lasers when the press mechanism is in the first position.

10. A heat press comprising:

a frame;

first and second lower platens supported by the frame;

an upper platen;

a press mechanism coupled to the upper platen and operable to move the upper platen between a closed position and an open position, wherein in the open position the upper platen is spaced apart from the first and second lower platens a greater distance than when in the closed position;

a shuttle mechanism supported by the frame and configured to move the press mechanism between a first position wherein the upper platen is located above the first lower platen, and a second position wherein the upper platen is located above the second lower platen;

a heating element configured to heat the upper platen;

a set of first lasers and a set of second lasers, each of the first lasers being coupled to the frame and configured to project laser light onto the first lower platen, each of the second lasers being coupled to the frame and configured to project laser light onto the second lower platen.

11. The heat press of claim 10, further comprising a set of first mounts and a set of second mounts, each of the first mounts supporting one of the first lasers for tilting, swiveling, and pivoting about a central point of the first mount, each of the second mounts supporting one of the second lasers for tilting, swiveling, and pivoting about a central point of the second mount.

12. The heat press of claim 11, further comprising:

a bracket fixedly coupled to the frame; and a bracket plate;

wherein a first end of each first mount includes a ball supported between the bracket and the bracket plate, and one of the first lasers is mounted to a second end of the first mount.

13. The heat press of claim 10, further comprising a controller configured to activate the first lasers and deactivate the second lasers when the press mechanism is in the second position, and to activate the second lasers and deactivate the first lasers when the press mechanism is in the first position.

14. The heat press of claim 10, wherein the shuttle mechanism includes a pair of rails, a carriage plate, and a keeper member, the rails being fixedly coupled to the frame, the carriage plate being slidably coupled to the rails and fixedly coupled to the press mechanism, the keeper member being fixedly coupled to the frame and configured engage a portion of the carriage plate when the press mechanism is operated, the keeper member preventing substantial pressing loads from transferring though the rails.

15. The heat press of claim 10, the further comprising:

a toggle linkage coupled to the frame, the toggle linkage including a lever and a clamp, the lever being coupled to the clamp to move the clamp between a locked position and an unlocked position;

wherein at least one of the first and second lower platens includes an alignment pin received in the frame;

wherein when the clamp is in the locked position the clamp engages the alignment pin to prevent removal of the one of the lower platens from the frame, and when the clamp is in the unlocked position the clamp disengages the alignment pin to permit the one of the lower platens to be disengaged from the frame.

16. A heat press comprising:

a frame;

first and second lower platens supported by the frame;

an upper platen;

a press mechanism coupled to the upper platen and operable to move the upper platen between a closed position and an open position, wherein in the open position the upper platen is spaced apart from the first and second lower platens a greater distance than when in the closed position;

a shuttle mechanism supported by the frame and configured to move the press mechanism between a first position wherein the upper platen is located above the first lower platen, and a second position wherein the upper platen is located above the second lower platen;

a heating element configured to heat the upper platen;

a toggle linkage coupled to the frame, the toggle linkage including a lever and a clamp, the lever being coupled to the clamp to move the clamp between a locked position and an unlocked position;

wherein at least one of the lower platens includes an alignment member received in the frame;

wherein when the clamp is in the locked position the clamp engages the alignment member to prevent removal of the one of the lower platens from the frame, and when the clamp is in the unlocked position the clamp disengages the alignment member to permit the one of the lower platens to be disengaged from the frame.

17. The heat press of claim 16, wherein the frame includes a ridge and the one of the lower platens defines a plurality of notches spaced circumferentially about the alignment member, a first one of the notches being configured to engage the ridge when the one of the lower platens is in a first orientation, a second one of the notches being configured to engage the ridge when the one of the lower platens is in a second orientation, wherein the one of the lower platens is prevented from rotating about the alignment member when one of the notches engages the ridge.

18. The heat press of claim 16, wherein the frame defines a first bore and a second bore that intersects with the first bore, wherein the alignment member is received in the first bore and the clamp is received in the second bore.

19. The heat press of claim 16, further comprising a set of first lasers and a set of second lasers, each of the first lasers being coupled to the frame and configured to project laser light onto the first lower platen, each of the second lasers being coupled to the frame and configured to project laser light onto the second lower platen.

20. The heat press of claim 16, wherein the shuttle mechanism includes a pair of rails, a carriage plate, and a keeper member, the rails being fixedly coupled to the frame, the carriage plate being slidably coupled to the rails and fixedly coupled to the press mechanism, the keeper member being fixedly coupled to the frame and configured engage a portion of the carriage plate when the press mechanism is operated, the keeper member preventing substantial pressing loads from transferring though the rails.

* * * * *